United States Patent
Han et al.

(10) Patent No.: US 7,435,336 B2
(45) Date of Patent: Oct. 14, 2008

(54) PROCESS FOR CARRYING OUT GAS-LIQUID COUNTERCURRENT PROCESSING

(75) Inventors: Baoping Han, Liaoning Province (CN); Xiangchen Fang, Liaoning Province (CN); Ronghui Zeng, Liaoning Province (CN); Ping Wu, Liaoning Province (CN); Mei Jin, Liaoning Province (CN); Hongjiang Sun, Liaoning Province (CN)

(73) Assignees: China Petroleum & Chenical Corporation, Beijing (CN); Fushun Research Institute of Petroleum and Petrochemicals Sinopec, Corp., Fushun, Liaoning Province (CN)

( * ) Notice: Subject to any disclaimer, the term of this patent is extended or adjusted under 35 U.S.C. 154(b) by 526 days.

(21) Appl. No.: 10/682,593

(22) Filed: Oct. 9, 2003

(65) Prior Publication Data
US 2004/0112794 A1  Jun. 17, 2004

(30) Foreign Application Priority Data
Oct. 10, 2002  (CN) ................................. 02 1 33121
Oct. 10, 2002  (CN) ................................. 02 1 33140

(51) Int. Cl.
*C10G 47/04* (2006.01)
*C10G 45/04* (2006.01)
(52) U.S. Cl. .................... 208/213; 208/210; 208/216 R; 208/217; 208/254 H
(58) Field of Classification Search ................. 208/213, 208/216 R, 217, 254 H
See application file for complete search history.

(56) References Cited

U.S. PATENT DOCUMENTS

| 4,795,824 | A | | 1/1989 | Kippax et al. |
| 5,043,509 | A | * | 8/1991 | Imai et al. .................... 585/466 |
| 5,183,556 | A | | 2/1993 | Reilly et al. |
| 5,252,198 | A | * | 10/1993 | Harrison et al. ......... 208/208 R |
| 5,985,131 | A | | 11/1999 | Gupta et al. |
| 5,985,135 | A | | 11/1999 | Gupta |
| 6,007,787 | A | | 12/1999 | Gupta et al. |
| 6,117,812 | A | * | 9/2000 | Gao et al. .................... 502/159 |
| 6,262,131 | B1 | * | 7/2001 | Arcuri et al. ................. 518/700 |
| 6,495,029 | B1 | * | 12/2002 | Schorfheide et al. ........ 208/213 |
| 6,497,810 | B1 | * | 12/2002 | Laccino et al. ................. 208/59 |

FOREIGN PATENT DOCUMENTS

| CN | 94117660.6 | 7/2001 |
| EP | 0651041 A1 | 3/1995 |

* cited by examiner

*Primary Examiner*—Tam M. Nguyen
(74) *Attorney, Agent, or Firm*—Cohen Pontani Lieberman & Pavane LLP

(57) ABSTRACT

The present invention relates to a process for carrying our gas-liquid countercurrent processing comprising passing the liquid material and the gas reactant in countercurrent flow through the fixed bed of catalyst in a reactor, characterized in that the fixed bed of catalyst includes two or more catalyst layers, with the difference of voidage between the adjacent catalyst layers being at least 0.05. The voidages of the catalyst layers can be increased or decreased in the direction of the flow of the liquid phase. The process of the invention can be effected with an increased range of gas-liquid ratio and an improved stability and flexibility.

20 Claims, No Drawings

PROCESS FOR CARRYING OUT GAS-LIQUID COUNTERCURRENT PROCESSING

BACKGROUND OF THE INVENTION

1. Field of the Invention

The present invention relates to a process for carrying out gas-liquid countercurrent processing, especially in the context of petroleum refining and organic chemical industries. In particular, the present invention relates to an improved process for carrying out a countercurrent contacting catalytic reaction in a gas-liquid-solid triphasic system.

2. Description of the Related Art

In the petroleum refining and the organic chemical industries, more and more attention is being paid to the development of gas-liquid countercurrent reactors. The gas-liquid countercurrent reactors achieve increased reaction efficiency between the gas and the liquid phases, and thus require a reduced amount of catalyst, leading to a lowered production cost. Additionally, the gas-liquid countercurrent reactors make it possible for endothermic or exothermic reactions to proceed under quasi-isothermal conditions, thus reducing the operation cost and increasing the economic benefit of the plants.

Besides, as stricter and stricter quality standards of the oil products are adopted throughout the world, the hydrocarbon hydrotreating processes tend to be carried out in the gas-liquid countercurrent reactors. Most of the hydrocarbon hydrotreating processes of the prior art are carried out in fixed-bed reactors, in which hydrogen and the hydrocarbon feedstock flow concurrently downward, contact the catalyst bed to effect catalytic reactions. However, hydrogen sulfide, ammonia and small hydrocarbon molecules resulting from the reactions inhibit further reactions in the process, such as desulfurization, denitrogenation, dearomatization and hydrocracking, giving rise to reduced reaction rates. In particular, the dearomatization reaction is drastically inhibited, for it is a reverse reaction whose reaction extent is proportional to the hydrogen partial pressure but inversely proportional to the reaction temperature, and as such proceeds at a decreasing reaction rate with the increase of the reaction temperature as a result of the hydrogenation plant being adiabatic. In view of all this, graded hydrogenation and/or gas-liquid countercurrent hydrogenation techniques become a good option for carrying out hydrocarbon hydrogenation, so as to render the latter proceeding at an increased hydrogen partial pressure, with little or even no vacillation of reaction temperature and with instant removal of the $H_2S$ and $NH_3$ formed during the reactions.

U.S. Pat. No. 5,985,135 proposes a two-stage hydrogenating process wherein an upflow and a downflow reactors are adopted, with a stripping unit immediately downstream of the first reactor. However, the process falls short of solving the problem of removing harmful gases and requires a high capital cost.

With a view to removing the harmful gases, many refineries are conducting research on processes for carrying out gas-liquid countercurrent hydrogenating. The hydrocarbon hydrotreating reactors currently available adopt a single-function catalyst bed consisting of a single type of catalyst loaded together, with the reaction proceeding in liquid phase. To guarantee the effectiveness factor of the catalyst, the reactor is only loaded with small particles of catalyst. On the other hand, the catalyst is loaded to a relatively big height, and is immersed in liquid; therefore, it must be in solid form to have enough mechanical strength. Indeed, in industrial gas-liquid countercurrent hydrogenating reactors, the catalyst is used as sphere or cylinder with a diameter less than 3 mm, and is loaded at a catalyst bed voidage of 0.35 to 0.45, much lower than the voidage for conventional countercurrent operations (>0.95). However, at such a catalyst bed voidage, the countercurrent reactors tends to cause flooding and an unstable operation of the plant.

U.S. Pat. No. 5,985,131 and U.S. Pat. No. 6,007,787 propose a method for loading catalyst wherein a gas by-pass is installed to avoid flooding. Such a method makes it possible for the countercurrent reactor to hold a reduced volume of liquid, and allows the plant to run at an increased range of gas-liquid ratio. Nonetheless, it is devised without regard to the gas-liquid distribution of the whole reactor, and cannot eliminate flooding in the reactor. Additionally, it gives rise to a lowered utilization of the reactor, and a lowered flexibility in the case of hydrotreating reactor, which is usually bulky. There are processes in the chemical industry and environmental protection section with similar defects.

U.S. Pat. No. 5,183,556 proposes a countercurrent hydrorefining process, employing a currently available plant, wherein the countercurrent reaction section is loaded with a catalyst of a single type, e.g. a catalyst comprising sulfides of non-noble metals or comprising noble metals. This process has the defects of flooding. In addition, it does not apply to drastic desulfurization and dearomatization of the feedstock. As the feedstock reaches greater and greater reaction extent, it undergoes further reactions at a lower and lower rate. In order to meet the product standards, the process requires high activity catalysts, preferably noble metal catalyst in the case of the dearomatization. However, if the process employs high activity catalysts, for example noble metal catalyst in the whole catalyst bed, the catalyst in the upper section of the reactor will be subject to deactivation as a result of the high $H_2S$ partial pressure. On the contrary, if the process employs a conventional catalyst of sulfides of non-noble metals, the catalyst in the lower section of the reactor will also be subject to deactivation due to sulfur loss as a result of the low $H_2S$ partial pressure, even loses all its activity.

In the gas-liquid countercurrent processing, the gas and liquid phases undergo constant changes in volume and viscosity respectively, which have an important influence on the operating stability of the plant. GB 8618888 relates to a process for synthesizing dialkyl maleate, comprising reacting maleic anhydride and an alkanol to give a monoalkyl maleate, and then reacting monoalkyl maleate with vapour of the alkanol in countercurrent flow in the presence of a catalyst. In the process, an evenly distributed bed of resin catalyst is employed. In the direction of the flow of the liquid phase, the viscous liquid stream of dialkyl maleate has an ever increasing content of dialkyl maleate; the gas phase becomes smaller and smaller in volume owing to its consumption during the reactions and thus cannot remove all the water formed during the reactions. In the end, the reactor has higher flow rates of the gas phase and the more viscous liquid phase in the lower section, where flooding tends to occur, and lower flow rates of the gas phase and the less viscous liquid phase in the upper section, where flooding rarely occurs. The process employs an evenly distributed catalyst bed without regard to the changing gas-liquid ratios at different sections of the reactors, and thus fails to improve the comprehensive operating flexibility and stability of the reactor. There are other similar processes with such defects.

SUMMARY OF THE INVENTION

In order to overcome the defects of the prior art process for carrying out gas-liquid countercurrent catalytic reactions, the present invention provides a new process for carrying out gas-liquid countercurrent processing, wherein a graded bed of catalyst is employed. The process operates in a stable mode at an increased range of gas-liquid ratio.

The inventive process for carrying out gas-liquid countercurrent processing comprises passing the liquid material and the gas reactant in countercurrent flow through the fixed bed of catalyst in a reactor, characterized in that the fixed bed of catalyst includes two or more catalyst layers, with the difference of voidage between the adjacent catalyst layers being at least 0.05.

DETAILED DESCRIPTION OF THE INVENTION

In accordance with the process of the invention, the liquid material and the gas reactant are passed through the fixed bed of catalyst in a reactor in countercurrent flow with each other. The fixed bed of catalyst includes two or more catalyst layers, with the difference of voidage between the adjacent catalyst layers being at least 0.05.

For the purpose of the invention, the term "voidage (of a catalyst layer)" is defined as follows:

$$\text{Voidage (of a catalyst layer)} = [(\text{the volume of the catalyst layer} - \text{the volume of the catalyst})/\text{the volume of the catalyst layer}]$$

wherein, the volume of the catalyst=the mass of the catalyst/the density of the catalyst in its moulded shape, measured by mercury displacement method (a conventional method).

In the present process, the catalyst bed typically includes 2 to 10 catalyst layers of identical or different heights. The difference of voidage between the adjacent catalyst layers is typically 0.05 to 0.65, and preferably 0.10 to 0.40. Depending on the intended reactions, the voidages of the catalyst layers can be increased or decreased in the direction of the flow of the liquid phase. The adjacent catalyst layers can be separated by a sieve-plate or the like, or they can be loaded without sieve-plate between them, or alternatively, they can be loaded with some portion of them mixed with each other. Within the catalyst layers, the catalyst is loaded in a random way, or in a way that the voidage increases or decreases in the direction of the flow of the liquid phase.

The reactor for carrying out the process of the invention includes catalyst layers with a voidage of 0.25 to 0.55, preferable 0.30 to 0.50, at the lower section, and catalyst layers with a voidage of 0.35 to 0.90, preferable 0.45 to 0.80 at the upper section. Between the lower and upper sections, the reactor can include catalyst layers with a voidage between those at the lower and upper sections.

In accordance with the intended voidages of catalyst layers, catalysts of different particle sizes and shapes can be loaded. For example, catalysts of a conventional particle size and shape, such as in the form of sphere, cylinder, trefoil and quatrefoil, are loaded in the lower section of the reactor (voidage of 0.25 to 0.55, preferable 0.30 to 0.50); the moulded catalysts in the form of spheres usually have a diameter of 1.0 to 3.0 mm, and those in the form of cylinders, trefoils and quatrefoils have a diameter of 1.0 to 2.5 mm and a length of 3.0 to 8.0 mm. On the other hand, catalysts of irregular shapes, such as ring, wheel, sphere with holes, or cylinder, trefoil or quatrefoil of large particle sizes are loaded in the upper section of the reactor (voidage of 0.35 to 0.90, preferable 0.45 to 0.80). The catalysts in the form of sphere with holes usually have a diameter of 1.5 to 6.0 mm; those in the form of cylinder, trefoil and quatrefoil of large particle size usually have a diameter of 1.5 to 4.5 mm and a length of 3.0 to 8.0 mm; those in the form of ring usually have a diameter of 8 to 50 mm and a length of 8 to 50 mm; and those in the form of wheel usually have a diameter of 8–50 mm and a length of 8 to 30 mm. In order to increase the voidage of the catalyst layers, catalyst of a single shape and particle size can be loaded together, or alternatively, catalysts of different particle sizes and shapes, including catalysts with a low void fraction and a high void fraction, are mixed and loaded together, or the catalysts can be mixed and loaded together with inert fillers with a high void fraction. Unless otherwise indicated, catalysts mixed and loaded together within a catalyst layer are different from each other only in shape and particle size, but are otherwise identical, for example in terms of active metal components. Inert fillers are usually in the form of Raschig rings of small particle sizes, especially short Raschig ring. Being well mixed and loaded together within a catalyst layer, catalysts and inert fillers of different particle sizes create an every distributed catalyst layer. For example, in the catalyst layers, for every particle of catalyst or inert filler of a high void fraction, one or more other particles of catalyst are displaced by it, thus creating a high voidage in the dimensions of particles.

The inventive process can be used to effect the gas-liquid countercurrent hydro-conversion of light or heavy distillates and residual oils, and especially the hydrotreating of light or heavy distillates at a reaction temperature falling within the boiling range of the feedstocks, such as the hydrodesulfurization or de-aromatization of diesel oils with a boiling range of 180 to 390° C., the refining of lubricant oils and the preparation of the base oil of lubricant oil by hydrogenation, the hydrocracking of VGO distillate, the hydrogenation (de-colorization) of the tail oil of the ethylene steam cracking process (with a boiling range of 200 to 465° C.), the preparing of chemical raw materials, the preparing of raw materials for spinnable bitumen, needle cokes and the like. In such gas-liquid countercurrent processing, the catalyst bed includes 2 to 10 catalyst layers with voidages decreasing in the direction of the flow of the liquid phase.

The inventors has conducted research on the countercurrent hydrocarbon hydrotreating processes in terms of, among others, the gas and liquid flow rates at different positions along the axis of the reactor, and has found that the reactor has an increased gas-liquid volume ratio at the upper section of the reactor owing to the presence of the small molecules formed during the reaction process and the raw material molecules evaporized into the gas phase under the reaction conditions, and thus is subject to flooding. In view of this, the process of the invention employs graded catalyst layers with different voidages, so as to accommodate different gas-liquid ratios at different positions along the axis of the reactor, improve the distribution of the flow rates within the countercurrent reactor, and increase the flexibility and stability of the operation. Hydrocarbon hydrogenation processes proceed at a certain hydrogen/oil volume ratio, and if the ratio is too low, the process cannot proceed in a satisfactory mode. The process of the present invention can proceed in stable operation in an increased range of hydrogen/oil volume ratios, thus having an improved utility. In addition, in the context of the gas-liquid countercurrent hydrotreating of diesel oil, in view of the content distribution and its changing profile of the impurities such as $H_2S$ within the reaction system, and the factors causing flooding, the process of the invention is carried out with a catalyst bed wherein catalysts of different functions are loaded at different sections of the reactor, so as to optimize the functional regions of the catalysts of different activities and subject the catalysts to optimum conditions respectively. As a result, the process is carried out with an increased activity of the catalyst bed, and more important, an increased service life of the catalysts, thus increasing the flexibility and the stability of the plant. In addition, the process of the present invention is preferably carried out with a randomly loaded catalyst bed, so as to make best use of the space of the reactor.

In the context of the hydroconversion of hydrocarbons, an embodiment of the process for carrying out the gas-liquid countercurrent processing of the invention is as follows:

(1) The countercurrent reactor is loaded at the lower section with a low-voidage layer or layers of catalyst with a conventional particle size, with the voidage of the catalyst layers being 0.25 to 0.55, and preferably 0.30 to 0.50, increasing in the direction of the flow of the gas materials; and (2) The countercurrent reactor is loaded at the upper section (i.e. from the inlet for the liquid raw materials, along the direction of the flow of the liquid raw materials, until before the front end of the low-voidage layer or layers of catalyst with a conventional particle size) with a high-voidage catalyst layer or layers. At the upper section of the reactor, the catalyst voidages are typically 0.35 to 0.90, and preferably 0.45 to 0.80, decreasing in the direction of the flow of the liquid raw materials.

In the context of the countercurrent hydrorefining of diesel distillate, the low-voidage catalyst layer or layers consist of a high activity catalyst susceptible to sulfur poisoning, such as a catalyst comprising a metal from Group VIB and a metal from Group VIII of the Periodic Table of Elements in a reduced state, a catalyst comprising a noble metal, a catalyst comprising the nitride or carbide of Mo—Ni—W, and a catalyst comprising the sulfides of non-noble metals which shows little loss of sulfur in the reactions. On the other hand, the high-voidage catalyst layer or layers consist of a hydrorefining catalyst comprising a metal from Group VIB and a metal from Group VIII of the Periodic Table of Elements in a sulfurized state. The low-voidage catalyst layer or layers constitutes 20–95%, and preferably 30–80%, of the total volume of the catalyst bed. The reaction proceeds under reaction conditions including a reaction temperature between 240 to 427° C., a reaction pressure between 1.0 to 20.0 MPa, a hydrogen/oil volume ratio of at least 50, typically 50 to 1,000, and preferably 100 to 1,000, and more preferably 300 to 700, and a liquid volume hourly space velocity of 0.1 to 7.5 $h^{-1}$.

The process of the present invention, with appropriate catalysts, can be applied to polymerization, condensation, absorption and the like in the chemical industry, and environmental protection section. For different reactions, the catalyst layer with a single voidage can consist of catalysts of the same compositions or different compositions, and the catalyst layers with different voidages can consist of catalysts of the same composition or different compositions. When used in synthesizing dialkyl maleate, for example, the process of the invention is carried out with a catalyst bed including 2 to 10 catalyst layers with increasing voidages in the direction of the flow of the liquid material to react the monoalkyl maleate with C1–C4 alkanol. The catalyst can be any resin catalysts conventionally used for that purpose, such as the acidic cation-exchange resin catalysts disclosed in U.S. Pat. No. 4,269,943, CN86102001, JP83-80307 and CN92101543.7.

In the case of polymerization, condensation, absorption and the like, the down-flowing liquid materials increases in terms of viscosity as the reactions proceed, while the up-going gas material decreases in volume. Consequently, the reactor is subject to flooding at the lower section of the reactor. In view of this, the process of the present invention is carried out with a catalyst bed including catalyst layers arranged in such a way that the voidages of the catalyst layers increase in the direction of the flow of the liquid material, and also bring about the advantages of the present invention.

In the following, the process of the invention will be described in more detail in connection with the gas-liquid countercurrent hydrotreating of the hydrocarbon raw materials and the synthesizing of dialkyl maleate.

In the context of the hydrotreating of hydrocarbons, the process of the present invention is carried out with a catalyst bed including catalyst layers of different voidages decreasing from the upper section to the lower section of the reactor. The catalyst bed generally consists of at least 2, and typically 2 to 10 catalysts with different void fraction. The voidages of the catalyst layers are selected in view of the nature (e.g. vaporizing behavior) of the raw materials and the amount of small molecules formed during reactions. In the case of a reaction system involving a big change in the volumes of the gas and liquid phases, the process of the present invention is carried out with a catalyst bed with a relatively large number of catalyst layers in which the difference of voidages between the adjacent catalyst layers is relatively big. On the contrary, in the case of a reaction system involving a small change in the volume of gas and liquid phases, the process of the present invention is carried out with a catalyst bed with a relatively small number of catalyst layers in which the difference of voidages between the adjacent catalyst layers is relatively small. Depending on the behavior of the raw materials in the reactions, the catalyst bed consists of catalysts of the same or different nature.

In the case of the hydrotreating of diesel oils, the process of the present invention can be carried out with a catalyst bed including 2 to 5 catalyst layers. In a preferred embodiment of the invention, the catalyst bed includes 2 catalyst layers with voidages decreasing in the direction of the flow of the liquid phase. In the catalyst bed, low-voidage layers constitute 20 to 90%, preferable 30 to 80% by volume of the total catalyst bed. The process proceeds under reaction conditions favorable to hydrocarbon hydrogenation, selected in view of the nature and boiling ranges of the raw material distillates, and the object of the processing. Generally, light distillate is hydrotreated at a lower temperature, pressure, and $H_2$/oil volume ratio, and a higher space velocity, while heavy distillate is hydrotreated at a higher temperature, pressure, and $H_2$/oil volume ratio, and a lower space velocity.

In the hydrotreating of diesel oil distillate, the low-voidage catalyst layers have a relatively high activity of hydro-desulfurization, hydro-denitrogenation, and hydro-dearomatization. The low-voidage catalyst layers usually consist of catalysts including an porous refractory inorganic oxide support, such as alumina, silica, alumina-silica, and/or zeolite molecular sieve, for example, super-stable Y, β, X, and Y zeolites and mordenite. As active components, the catalysts include a metal from Group VIB and/or a metal from Group VIII of the Periodic Table of the Elements, for example, W, Mo, Co and Ni, in reduced or suifurized state, or nobie metals, for example Pt and Pd, or nitrides or carbides of Mo, Ni and W. The high-voidage catalyst layers consist of conventional hydrorefining catalysts, comprising as support a porous refractory inorganic oxide, for example, alumina, silica, alumina-silica and/or zeolite molecular sieve, for example, super-stable Y, β, X, and Y zeolites and mordenite; as active components, oxides or sulfides of a metal from Group VIB and/or a metal from Group VIII of the Periodic Table of the Elements, for example W, Mo, Co and Ni, and optionally as promoter P, Si, F and B. The catalysts of the low-voidage and high-voidage catalyst layers contain any levels of the active metals and promoters well known to those skilled in the art. For example, the catalysts contains 0.05 to 5% by weight of one or more noble metals, or 10 to 40% by weight of one or more non-noble metals, calculated as oxide. The catalysts can be made according to any known methods.

In the synthesis of dimethyl maleate, the monomethyl maleate (or maleic anhydride) is contacted in countercurrent flow with methanol vapour over the esterification catalyst bed. The catalyst bed includes catalyst layers of different voidages, which increases from the upper to the lower sections of the reactor. The catalyst bed consists of 2 or more, typically 2 to 10 catalysts with different void fraction. Also, the voidages of the catalyst layers can be selected in view of the nature of the raw materials (including the vapourizing behaviour) and the amount of the small molecules formed during reactions. The shape of catalysts with different void fraction can be selected as described above. In a preferred embodiment, the catalyst bed includes 3 catalyst layers with voidages increasing in the direction of the flow of the liquid phase. The reaction can be conducted under conditions well known to those skilled in the art, for example those including a temperature of 90 to 140° C., a pressure of 0.1 to 1 MPa, a residence time of 0.1 to 10 hours and a molar ratio between methanol and monomethyl maleate of 1.5 to 10. Monomethyl maleate is fed to the reactor as liquid from the top while methanol is fed to the reactor as vapour from the bottom.

EXAMPLES 1 TO 11 AND COMPARATIVE EXAMPLE 1

These examples relate to the countercurrent hydrotreating of diesel oils, illustrating the maximum hydrogen/oil volume ratio at which a stable operation is maintained.

The properties of the feedstocks and the processing conditions are summarized in table 1. The catalysts and inert fillers used in the examples are listed in table 2. The reactions were run in a continuous mode. Experiments had showed that if an acceptable product was to be obtained, the feedstocks had to be treated in a catalyst bed including at least 40%, based on the total volume of the catalyst bed, of a low-voidage catalyst layer at the lower section of the reactor. Accordingly, in the present examples, the catalyst bed included 45%, based on the total volume of the catalyst bed, of a low-voidage catalyst layer. The experiment results are shown in table 3.

TABLE 1

Properties of the Feedstock oils and the Processing Conditions

| Feedstock | | Operating Conditions | |
|---|---|---|---|
| Item | value | Item | value |
| Density (20° C.), g/ml | 0.8793 | Reaction temperature, ° C. | 340 |
| Boiling range, ° C. | | Reaction pressure, MPa | 8.0 |
| IBP/10% | 205/234 | Volume hourly space velocity, $h^{-1}$ | 1.5 |
| 30/50% | 258/282 | | |
| 70%/90% | 309/336 | | |
| EBP | 349 | | |

TABLE 2

The Properties of the Catalysts and Inert Fillers

| Item | Inert filler | | catalysts |
|---|---|---|---|
| shape | Raschig ring | trefoil | Raschig ring |
| designation | A | B | C |
| Diameter, mm | 25 × 25 | 2.03 | 16 × 16 |
| Voidage* | 0.76 | 0.48 | 0.75 |

Note:
*: as measured in a loaded layer of a single catalyst or filler

TABLE 3

Experiment results

| | Example No. | | | |
|---|---|---|---|---|
| | Comp. 1 | 1 | 2 | 3 |
| High voidage layer (1) | B | C:B = 2:8 | C:B = 3:7 | C:B = 4:6 |
| Voidage of (1) | 0.48 | 0.557 | 0.606 | 0.653 |
| Low voidage layer (2) | B | B | B | B |
| Maximum $H_2$/oil vol. ratio | 310 | 412 | 490 | 565 |

| | Example No. | | | |
|---|---|---|---|---|
| | 4 | 5 | 6 | 7 |
| High voidage layer (1) | C:B = 5:5 | C:B = 7:3 | C | A:B = 2:8 |
| Voidage of □1□ | 0.687 | 0.732 | 0.751 | 0.661 |

TABLE 3-continued

| | Experiment results | | | |
|---|---|---|---|---|
| Low voidage layer(2) | B | B | B | B |
| Maximum H$_2$/Oil vol. ratio | 723 | 830 | 900 | 580 |

| | Example No. | | | |
|---|---|---|---|---|
| | 8 | 9 | 10 | 11 |
| High voidage layer (1) | A:B = 3:7 | A:B = 4:6 | A:B = 5:5 | A:B = 7:3 |
| Voidage of (1) | 0.672 | 0.691 | 0.752 | 0.755 |
| Low voidage layer (2) | B | B | B | B |
| Maximum H$_2$/oil vol. ratio | 653 | 733 | 907 | 963 |

From the experiment results, it can be seen that, by employing a catalyst bed with catalyst layers of graded voidages and particle sizes, the operable range of H$_2$/oil ratios at a certain space velocity is much larger than that of the prior art with a conventional voidage and particle size, thus increasing the flexibility of the process.

In the following, the process of the invention will be described in connection with the countercurrent desulfurization and dearomatization of the diesel oils, showing its advantages in terms of the product quality and operation stability.

EXAMPLES 12–17 AND COMPARATIVE EXAMPLES 2–3

The catalysts and the feedstocks used in these examples have properties as shown in tables 4 and 5 respectively. The hydrotreating reactions were run in a continuous mode under reaction conditions including a pressure of 6.0 MPa, a temperature of 360° C., a hourly space velocity of 1.5 h$^{-1}$. The low-activity catalyst layer was designated as V1 and the high-activity catalyst layer was designated as V2. The catalysts were used in volume ratio as indicated in the table. The results for examples 12–17 and comparative examples 2–3 were summarized in table 6 and 7 respectively.

TABLE 4

Physico-chemical properties of the catalysts

| Item | High-activity catalyst | | Low-activity catalyst | |
|---|---|---|---|---|
| Designation | D | E | F | G |
| Active components of the catalysts | Nitrides of Co, Mo(atomic ratio of Co to Mo: 1:3) | Pt–Pd in reduced state (atomic ratio 1:1) | Sulfides of Co, Mo(atomic ratio of Co to Mo: 1:2) | Sulfides of Co, Mo(atomic ratio of Co to Mo: 1:2) |
| shape | cylinder | Cylinder | trefoil | Raschig ring |
| Diameter, mm | 1.9 | 1.9 | 3.08 | 16 × 16 |
| voidage | 0.44 | 0.45 | 0.52 | 0.75 |
| Metal component*, w % | 26 | 0.8 | 29 | 29 |
| Pore volume of the catalyst, ml/g | 0.38 | 0.31 | 0.35 | 0.41 |
| Specific surface area, m$^2$/g | 241 | 284 | 229 | 263 |
| support | Alumina containing 4% by weight silica | USY molecular sieve | alumina | Alumina containing 5% by weight silica |

*calculated as oxide of metal for non-noble metals.

TABLE 5

Properties of the feedstocks

| Density, K/m$^3$ | 0.8824 |
|---|---|
| S, μg/g | 6979 |
| N, μg/g | 1014 |
| Aromatics level, w % | 48.6 |
| Boiling range, ° C. | |
| IBP to EBP | 185–373 |

TABLE 6

Experiment results

| examples | 12 | 13 | 14 | 15 | 16 | 17 |
|---|---|---|---|---|---|---|
| V1 cat. | F | G | F:G = 6:4 | F:G = 7:3 | F:G = 8:2 | F:G = 5:5 |
| V2 cat. | D | E | E | E | D | E |
| V1 voidage, % | 0.52 | 0.75 | 0.65 | 0.61 | 0.56 | 0.70 |
| V1:V2 | 8:2 | 7:3 | 6:4 | 5:5 | 4:6 | 3:7 |

TABLE 6-continued

| | Experiment results | | | | | |
|---|---|---|---|---|---|---|
| examples | 12 | 13 | 14 | 15 | 16 | 17 |
| H$_2$/oil volume ratio | 280 | 800 | 300 | 450 | 500 | 550 |
| | Properties of the products | | | | | |
| Density, /m$^3$ | 0.8356 | 0.8356 | 0.8357 | 0.8358 | 0.8358 | 0.8359 |
| S, μg/g | 19.4 | 18.2 | 15.5 | 12.2 | 11.6 | 10.9 |
| N, μg/g | 1.0 | 1.0 | 1.0 | 1.0 | 1.0 | 1.0 |
| Aromatics, w % | 16.2 | 14.2 | 13.2 | 11.3 | 10.1 | 9.8 |

TABLE 7

Stability observed in the process of the invention as compared with the comparative processes

| | | examples | | |
|---|---|---|---|---|
| | | 14 | Com. 2 | Com. 3 |
| V1 cat. | | F:G = 6:4 | E | F |
| V2 cat. | | E | E | F |
| V1 voidage, % | | 0.65 | / | / |
| V1:V2 | | 6:4 | / | / |
| H$_2$/oil volume ratio | | 300 | 250 | 300 |
| The properties of the product oils | | | | |
| Initial activity (24 hours) | S, μg/g | 15.5 | 14.3 | 20.5 |
| | N, μg/g | 1.0 | 1.0 | 3.8 |
| | Aromatics, w % | 13.2 | 11.6 | 21.2 |
| 500 hours | S, μg/g | 15.5 | 176 | 182 |
| | N, μg/g | 1.0 | 58 | 72 |
| | Aromatics, w % | 13.2 | 27.3 | 30.4 |
| 1500 hours | S, μg/g | 16.4 | 482 | 350 |
| | N, μg/g | 1.3 | 172 | 138 |
| | Aromatics, w % | 14.1 | 43.3 | 40.4 |

EXAMPLE 18

Dialkyl maleate was synthesized over a resin catalyst by a countercurrent process from monoalkyl maleate and methanol under the reaction conditions including a temperature of 120° C., a pressure of 0.5 MPa, a molar ratio between methanol and monoalkyl maleate of 5:1, and a liquid residence time of 3 hours. The catalyst was micro-sphere of styrene-divinylbenzene copolymer with different particle sizes, treated in accordance with a method as described in example 1 of CN92101543.7. The layers of catalyst of different particle sizes have voidages as listed in table 8. From above down, the catalyst bed included catalysts S-1, S-2 and S-3 in a volume ratio of 2:1:1. The conversion of monoalkyl maleate was 89%.

TABLE 8

Voidages of layers of resin catalysts with different particle sizes

| | catalysts | | |
|---|---|---|---|
| | S-1 | S-2 | S-3 |
| Particle sizes, mm | 0.5 | 0.8 | 1.5 |
| Voidages of the catalyst layers | 0.25 | 0.31 | 0.42 |

EXAMPLE 19

Example 18 was repeated except that the catalyst bed included catalysts S-2 and S-3 in a volume ratio of 2:1 from above down. The conversion of monoalkyl maleate was 88%.

COMPARATIVE EXAMPLE 4

Example 18 was repeated except that the catalyst bed included solely catalyst S-2. The conversion of monoalkyl maleate was 84%.

We claim:

1. A process for carrying out gas-liquid countercurrent processing, comprising passing the liquid material and the gas reactant in countercurrent flow through the fixed bed of catalyst in a reactor, wherein the fixed bed of catalyst includes two or more catalyst layers, with the difference of voidages between the adjacent catalyst layers being at least 0.05.

2. The process of claim 1 wherein the bed of catalyst includes 2 to 10 catalyst layers.

3. The process of claim 1 wherein the difference of the voidages between the adjacent catalyst layers is 0.05 to 0.65.

4. The process of claim 3 wherein the difference of the voidages between the adjacent catalyst layers is 0.10 to 0.40.

5. The process of claim 1 wherein the two or more catalyst layers comprise at least one low-voidage catalyst layer and at least one high-voidage catalyst layer, the voidage of the low-voidage catalystlayer is 0.25 to 0.55, and the voidage of the high-voidage catalyst layer is 0.35 to 0.90.

6. The process of claim 5 wherein the voidage of the low-voidage catalyst layer is 0.30 to 0.50, and the voidages of the high-voidage catalyst layer is 0.45 to 0.80.

7. The process of claim 5 wherein the low-voidage catalyst layer consists of catalyst in the form of sphere, cylinder, trefoil or quatrefoil.

8. The process of claim 5 wherein the high-voidage catalyst layer consists of catalyst in the form of ring, wheel, sphere with holes, or cylinder, trefoil or quatrefoil of large particle size.

9. The process of claim 8 wherein the high-voidage catalyst layer consists of catalyst of a single particle size or shape, or alternatively, consist of catalyst of a low void fraction and catalyst of a high void fraction and/or filler of a high void fraction mixed and loaded together.

10. The process of claim 1 wherein the catalyst is loaded in a random mode.

11. The process of claim 1 wherein the liquid raw material is monoalkyl maleate, the gas reactant is C1-C4 alkanol, and the catalyst bed consists of an esterification catalyst, with the voidage of the catalyst layers within the catalyst bed increasing in the direction of the flow of the liquid phase.

12. The process of claim 11 wherein the esterification catalyst is an acidic cation-exchange resin catalyst.

13. The process of claim 11 wherein the catalyst bed includes three catalyst layers.

14. The process of claim 1 wherein the voidage of catalyst layers is increased or decreased in the direction of the flow of the liquid phase.

15. A gas-liquid countercurrent process comprising passing diesel oil distillate and hydrogen in countercurrent flow through a fixed bed of hydrotreating catalyst in a reactor, wherein the fixed bed of catalyst includes at least two catalyst layers, and the voidage of the at least two catalyst layers decreased in the direction of the flow of the diesel oil distillate, with the difference of voidage between the adjacent catalyst layers being at least 0.05.

16. The process of claim 15 wherein the catalyst bed includes one low-voidage layer at the lower section and one high-voidage layer at the upper section of the reactor, with the low-voidage layer constituting 20 to 90% of the total volume of the catalyst bed.

17. The process of claim 16 wherein the low-voidage layer constitutes 30 to 80% of the total volume of the catalyst bed.

18. The process of claim 15 wherein the low-voidage catalyst layer or layers consist of one or more catalysts selected from the group consisting of a catalyst comprising a metal from Group VIB and a metal from Group VIII of the Periodic Table of Elements in a reduced state, a catalyst comprising a noble metal, a catalyst comprising the nitride or sulfide of Mo-Ni-W, and a catalyst comprising the sulfides of non-noble metals from Group VIB and a metal from Group VIII which shows little loss of sulfur in the reaction; the high-voidage catalyst layer or layers consist of a hydrorefining catalyst comprising a metal from Group VIB and a metal from Group VIII of the Periodic Table of Elements in a sulfurized form.

19. The process of claim 18 wherein the noble metal is Pt and/or Pd, the metal from Group VIB is Mo and/or W, the metal from Group VIII is Co and/or Ni, the support is a porous refractory inorganic oxide; the content of the noble metal is 0.05 to 5% by weight, and the content of the non-noble metal is 10 to 40% by weight, calculated as oxide.

20. The process of claim 15 wherein the reaction proceeds under reaction conditions of a reaction temperature between 240 to 427° C., a reaction pressure between 1.0 to 20.0 MPa, a hydrogen/oil volume ratio of 50 to 1,000, and a liquid volume hourly space velocity of 0.1 to 7.5 $h^{-1}$.

* * * * *